Patented May 13, 1924.

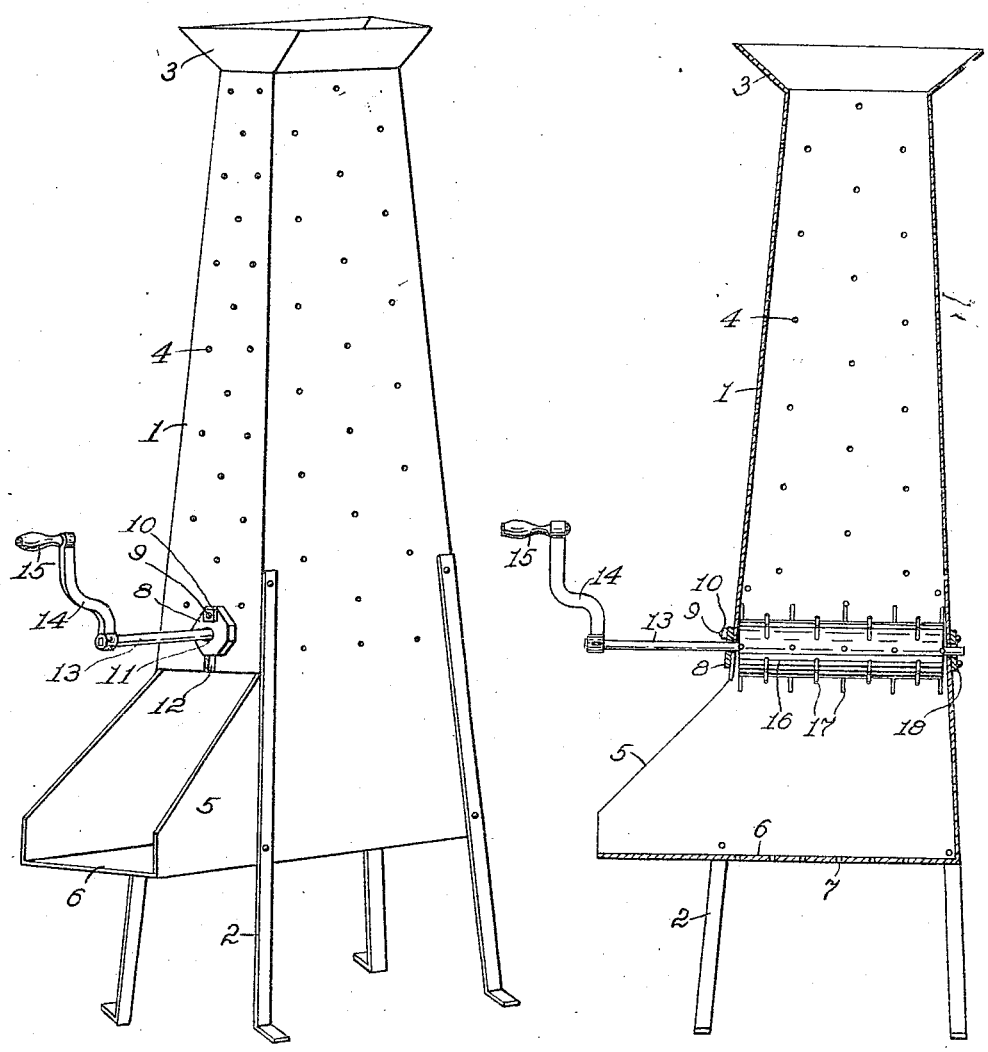

1,493,722

UNITED STATES PATENT OFFICE.

HENRY APPEL, OF WATERLOO, IOWA.

GRAIN SPROUTER.

Application filed August 2, 1923. Serial No. 655,288.

*To all whom it may concern:*

Be it known that I, HENRY APPEL, a citizen of the United States of America, and a resident of Waterloo, Black Hawk County, Iowa, have invented certain new and useful Improvements in Grain Sprouters, of which the following is a specification.

My invention relates to improvements in grain sprouters, and the object of my improvement is to supply a device of this class of simple and inexpensive construction, having a rotatable bottom delivery element operable to discharge the sprouted grain at the bottom of the device progressively as sprouted and required.

This object I have accomplished by the means which are hereinafter described and claimed, and which are illustrated in the accompanying drawings, in which Fig. 1 is a perspective elevation of the device, and Fig. 2 is a medial vertical section thereof.

The numeral 1 denotes an open top vertically elongated container having a plurality of small perforations 4 in its walls and having a flaring hopper top 3. This container is preferably expanded gradually downwardly but may be of any other desired shape to receive and contain grain, such as oats or barley to be sprouted therein.

The container 1 is supported on legs 2 to raise its bottom 6 above the supporting surface, and one side wall is cut away at the lower end to provide a relatively large lateral opening above the bottom plate 6. The plate 6 is projected beyond the container and provided with side walls to supply a projecting chute 5. The bottom plate 6 may be perforated at 7 for drainage purposes.

The side wall above said chute 5 and the opposite wall will have bearing-blocks 8 and 18 respectively secured thereon with bearing openings registering with bearing openings in said walls to rotatably seat a shaft 13 carrying a roller or drum 16 provided with staggered rows of circumferential radial pins or detents 17, the drum being positioned within the hollow of the container 1 immediately above the side discharge port thereof. In order to permit of seating and unseating the shaft, a vertical slot 12 is made in the wall of the container back of the front bearing-block 8. The block 8 is removably secured to the container by a bolt 9 and nut 10, so that before securing the block, the shaft 13 may be swung up through the slot 12 after its rear end has been inserted into the bearing opening of the rear bearing-block 18, and then the block 8 may be fixed in place by the bolt and nut 9 and 10. On the forward outwardly projecting end of the shaft 13 is removably secured a crank 14 having a handle 15. When the shaft 13 is rotated by means of its crank-handle 15 in its bearing openings 11 in the blocks 8 and 18, the pin-detents sweep in succession past and close to opposite walls of the container, so that the drum and its detents provide an orificed and rotatable closure for the container just above the port of discharge and the chute 5.

Initially, a small amount of straw is deposited in the container upon the dentated drum 16—17 which closes the spaces between the detents 17. A pailful of oats or barley which has been previously soaked in water for 24 hours is then deposited within the container upon the straw covering of said drum. Each succeeding day thereafter the same amount of soaked grain is deposited in the container for four days in all, filling the container. On the fifth day, the lowermost part of the soaked grain will have sprouted sufficiently for removal, so that the drum may be rotated by means of said crank 14, the detents 17 carrying down and discharging into the chute 5 the sprouted grain which after draining by means of the perforations 7 may be withdrawn, and another pailful of soaked grain placed in the container. This succession of operations may be continued as long as desired. The contents of the container are aerated by means of the perforations 4 in its walls.

Artificial heating is not usually required, but in cold weather the device may be placed near a stove or furnace, at other times the normal mild temperature of the outer air is sufficient to cause the soaked grain to sprout.

Having described my invention, what I claim as new, and desire to secure by Letters Patent, is:

A grain sprouter, comprising a hollow vertically elongated receptacle with open top and gradually widening downwardly to an apertured closed bottom, one part of the side wall thereof having a lateral delivery opening with the bottom of the receptacle extended outwardly below said opening to furnish a delivery lip, the side walls of the receptacle above the level of said opening having numerous small apertures, and a rotatable drum mounted across the interior of said receptacle immediately above said opening and having radiating pins thickly distributed thereupon projecting to and clearing the inner wall of the receptacle to serve as a rotatable support and delivery device for sprouted grain thereon.

Signed at Waterloo, Iowa, this 3rd day of July, 1923.

HENRY APPEL.